No. 852,245. PATENTED APR. 30, 1907.
O. STEWART.
HANDLE FOR HOES AND RAKES.
APPLICATION FILED DEC. 27, 1906.
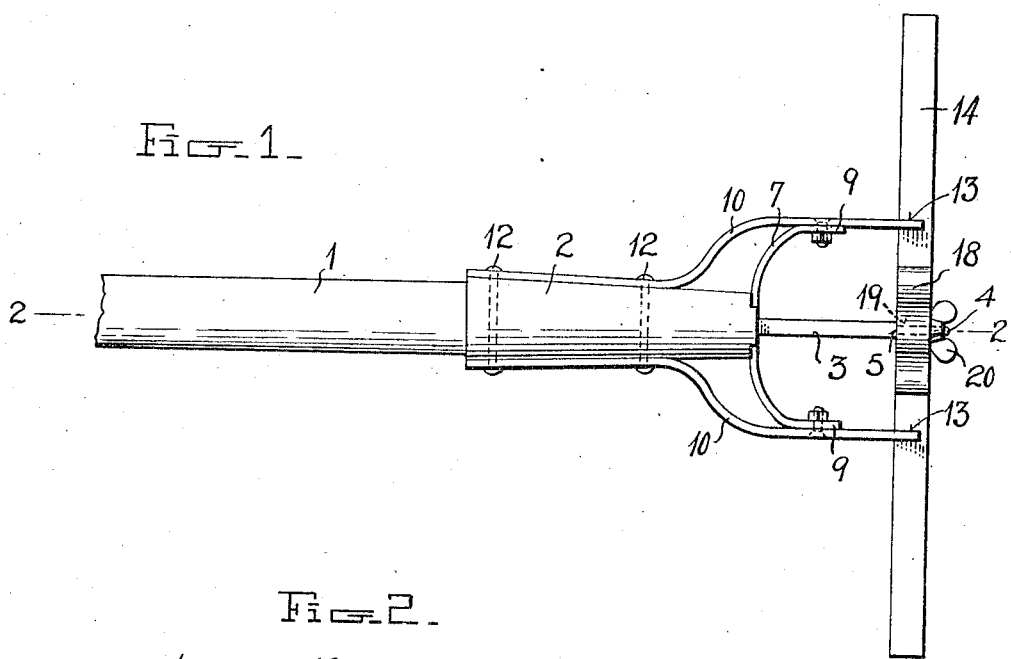
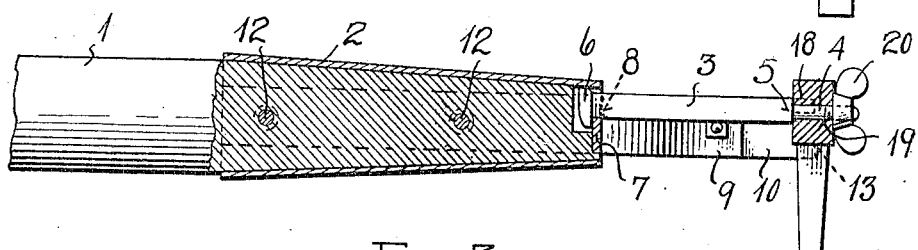
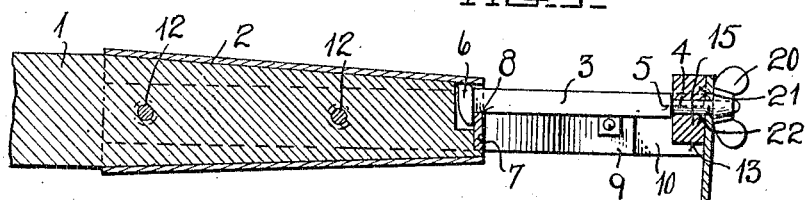
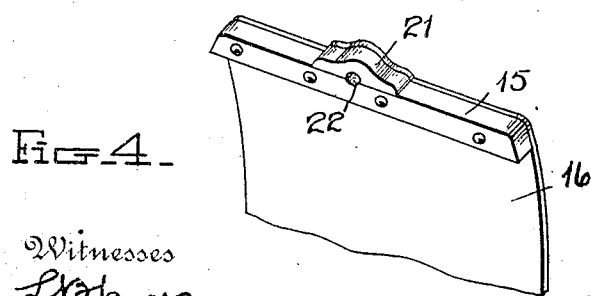
Witnesses
L. N. James
C. H. Griesbauer
Inventor
Oliver Stewart
by H. B. Willson & Co.
Attorneys

UNITED STATES PATENT OFFICE.

OLIVER STEWART, OF CENTRALIA, ILLINOIS.

HANDLE FOR HOES AND RAKES.

No. 852,245.     Specification of Letters Patent.     Patented April 30, 1907.

Application filed December 27, 1906. Serial No. 349,668.

*To all whom it may concern:*

Be it known that I, OLIVER STEWART, a citizen of the United States, residing at Centralia, in the county of Marion and State of Illinois, have invented certain new and useful Improvements in Handles for Hoes and Rakes; and I do declare the following to be a full, clear, and exact description of the invention, such as will enable others skilled in the art to which it appertains to make and use the same.

This invention relates to improvements in handles for hoes, rakes and the like.

The object of the invention is to provide a handle of this character having means whereby different forms of hoes, rakes or similar tools may be removably secured thereto, thereby enabling one handle to be employed for a variety of tools.

A further object is to provide means whereby the tool heads may be quickly attached to and removed from the handle and whereby when the tools are in place they will be rigidly held and braced.

With the above and other objects in view, the invention consists of certain novel features of construction, combination and arrangement of parts, as will be hereinafter described and claimed.

In the accompanying drawings:—Figure 1 is a plan view of the handle, showing the same attached to a rake head; Fig. 2 is a vertical sectional view of the same on the line 2—2 of Fig. 1; Fig. 3 is a central vertical sectional view, showing the handle attached to a hoe; and Fig. 4 is a detail perspective view, showing the construction of the hoe blades to receive the handle. Fig. 5 is a detail perspective of the tooth bar and arms.

Referring more particularly to the drawings, 1 denotes the handle, on the lower end of which is arranged a ferrule 2, and in said lower end is secured a rectangular bar or tang 3. The outer end of the tang 3 is reduced and threaded to form a cylindrical bolt 4, at the inner end of which adjacent to the square portion of the tang are formed shoulders 5. On the inner end of the tang 3 is formed a squared head 6 adapted to be seated in the end of the handle and ferrule, as shown.

The tang is held in place by means of a curved brace-bar 7, which is seated in a notch or recess formed in the end of the handle and ferrule, and is provided with a notch 8 to engage the squared portion of the tang adjacent to the head 6 thereof, thereby firmly securing the tang in place in the end of the ferrule. The brace 7 is provided with forwardly-projecting ends 9, to which are bolted forwardly-projecting head engaging arms or bars 10. The inner ends of the arms or bars 10 converge or bend inwardly, and are bolted or otherwise secured to the opposite sides of the ferrule, as shown at 12. The forward or outer ends of the arms 10 are provided with squared notches or recesses 13, which are adapted to be engaged with the tooth bar 14 of the rake heads or with a transversely-disposed fastening bar 15 secured to or formed on the upper edge of the inner side of the hoe blades 16, as clearly shown in Figs. 3 and 4 of the drawings.

The tooth bar of the rack is provided midway between its ends with an enlarged portion 18, in which is formed a hole 19, through which the reduced threaded end 4 of the tang is adapted to be inserted. Said threaded end 4 projects through the bar, and is adapted to receive a clamping nut 20, which when screwed thereon firmly clamps the rake head into engagement with the squared shoulders 5 on the tang and with the recesses or notches 13 in the end of the arms 10.

The bar 15 on the hoe blade 16 is also provided with a central, enlarged portion 21, in which is formed a centrally-disposed aperture 22 to receive the reduced end of the tang in the same manner as described in connection with the toothed bar of the rake. By providing a handle constructed as herein shown and described the same may be readily attached to and detached from various forms of hoes or rake heads and when attached thereto will firmly hold the same in position for use.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as defined by the appended claims.

Having thus described my invention, what I claim as new and desire to secure by Letters-Patent, is:—

1. A handle of the character described having arranged on its outer end a ferrule, a tang arranged in the outer end of said ferrule and handle, a curved brace to engage said tang and hold the same in place in the ferrule, means to secure a hoe or rake head on the outer end of said tang, and a forwardly-projecting arm connected to the ferrule and to said tang brace to engage and brace the hoe or rake head secured to the tang, substantially as described.

2. A handle of the character described having arranged on its outer end a ferrule, a headed tang arranged in the outer end of the ferrule and handle, a notched brace bar to engage said tang and hold the same in position in the end of the ferrule, a reduced threaded hoe or rake head engaging portion formed on the outer end of said tang adapted to be inserted through the head of the rake or hoe, a clamping nut adapted to be screwed onto said portion to hold the rake or hoe head thereon, and means to brace and support said hoe or rake head, substantially as described.

3. A handle of the character described having arranged on its outer end a ferrule, a headed tang arranged in the outer end of the ferrule and handle, a notched brace bar to engage said tang and hold the same in position in the end of the ferrule, a reduced threaded hoe or rake head engaging portion formed on the outer end of said tang adapted to be inserted through the head of the rake or hoe, a clamping nut adapted to be screwed onto said portion to hold the rake or hoe head thereon, forwardly-projecting arms or bars secured at their inner ends to the opposite side of the ferrule, said bars having on their upper ends notches or recesses to receive the bar of the rake or hoe head, and means to secure the outer ends of the tang brace to said arms or bars, substantially as described.

In testimony whereof I have hereunto set my hand in presence of two subscribing witnesses.

OLIVER STEWART.

Witnesses:
WILLIAM E. O'MELVENY,
HOMER GILLETT.